No. 814,129. PATENTED MAR. 6, 1906.
A. GUFLER.
COOKING UTENSIL.
APPLICATION FILED MAR. 24, 1905.

Witnesses
Max B. A. Doring
Wm. M. Golden Jr.

Inventor
Anton Gufler
By his Attorney
Max D. Ordmann

UNITED STATES PATENT OFFICE.

ANTON GUFLER, OF NEW YORK, N. Y.

COOKING UTENSIL.

No. 814,129.  Specification of Letters Patent.  Patented March 6, 1906.

Application filed March 24, 1905. Serial No. 251,755.

*To all whom it may concern:*

Be it known that I, ANTON GUFLER, a subject of the Emperor of Austria-Hungary, and a resident of New York, in the county of New York and State of New York, have invented certain new and useful Improvements in Cooking Utensils, of which the following is a specification.

The present invention relates to a cooking utensil, and particularly to a kitchen-pot designed for cooking soups or the like, and has for its object to provide the same with a flange below the rim thereof, whereby a drip-channel is obtained, which will receive and retain any overflow from the pot when the liquid therein is boiling over, thus preventing the soiling of the stove or the floor.

It is well known that in cooking any liquid much annoyance is experienced from the overflow of the liquid when the same boils over, which smears the stoves, and besides much of the liquid is lost.

My invention, by which these drawbacks will be overcome, will be better understood from the accompanying drawings, in which similar letters denote corresponding parts, and in which—

Figure 1:
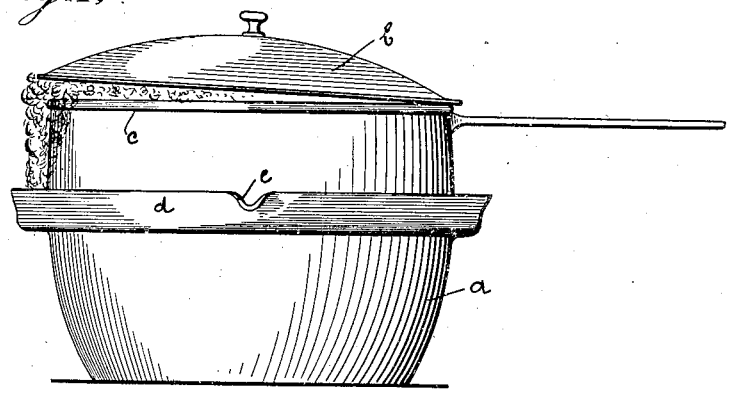
Figure 2:
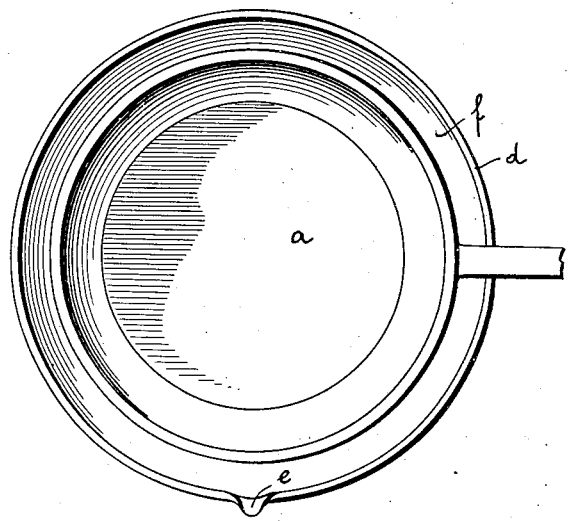
Figure 3:
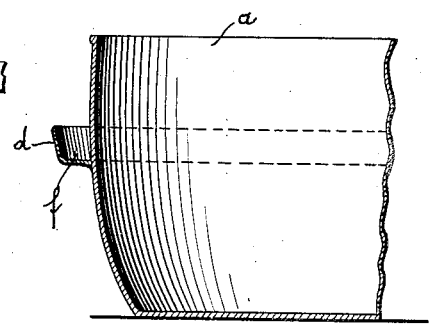
Figure 4:
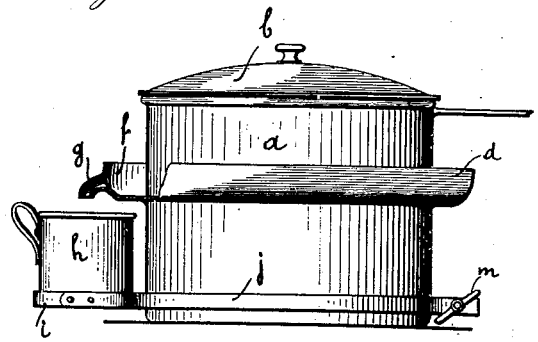
Figure 5:
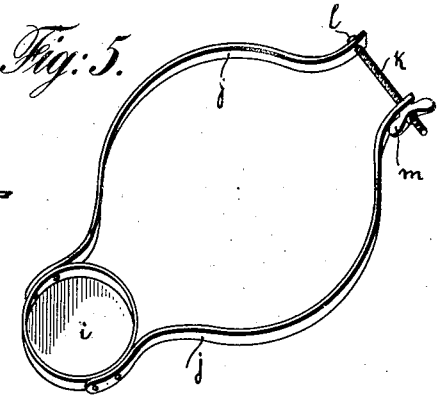

Figure 1 shows a vertical view of the pot; Fig. 2, a top plan view of the same with the cover removed therefrom; Fig. 3, a vertical section of the pot, a part thereof being broken away; Fig. 4, a vertical view of a modification, and Fig. 5 a detail.

With reference to the drawings, $a$ is the pot, and $b$ its cover. Attached to the pot at a suitable place below its rim or upper edge $c$ is an upwardly-bent flange $d$, passing around its circumference. This flange forms a drip or overflow channel $f$ to receive the overflowing liquid when the same is boiling over. At the upper edge the flange $d$ may be provided with a spout $e$ to allow the liquid accumulated in the drip-channel to be poured therefrom.

In order to prevent an overflow of the liquid from the drip-channel $d$, the same may be provided with a spout or nozzle $g$ below its upper edge, as shown in the modification of Fig. 4, and a receptacle $h$ may be located beneath said spout $g$ to receive the liquid flowing or dripping down the spout $g$.

The receptacle $h$ may advantageously rest upon a support $i$, which may be rigidly attached to the lower part of the pot in any convenient manner so as to allow of the pot to be carried about from place to place together with the receptacle $h$. The latter will receive the liquid dropping through the spout $g$. In the present arrangement the support $i$ is provided with spring-arms $j\ j$, adapted to fit around the lower part of the pot $a$. The free ends of the spring-arms may be provided with threaded holes to receive a screw-bolt $k$, having at one end a head $l$ and bearing at the other end a nut $m$. By means of this arrangement the support $i$ can be easily attached and tightened to the pot. I do not, however, restrict myself to this particular arrangement, as it will be understood that some changes may be made with the various parts of the arrangements shown without departing from the spirit of my invention.

What I claim, and desire to secure by Letters Patent, is—

1. The combination with a cooking utensil or a kitchen-pot of a flange arranged below its upper rim, said flange extending all around the pot and being bent upward to form a drip-channel, a spout or hole below the upper edge of said flange to prevent the liquid accumulating therein from overflowing, and a support suitably attached to the lower part of the pot, a receptacle adapted to rest upon said support below the above-stated spout and to receive the liquid dropping down the latter, substantially and for the purpose as specified.

2. The combination with a cooking utensil or a kitchen-pot, of a flange below the upper edge of the pot forming an overflow-channel, a hole or spout below the upper edge of the flange, a support having spring-arms adapted to fit around the lower part of the pot, and means attached to the free ends of the spring-arms to allow of the spring-arms to be tightened upon the pot and a receptacle adapted to rest upon said support below the above-stated spout or hole of the overflow-channel, substantially and for the purpose as specified.

Signed at the city of New York, in the county of New York and State of New York, this 20th day of March, A. D. 1905.

ANTON GUFLER.

Witnesses:
MAX D. ORDMANN,
ALFRED KORMF.